May 10, 1938.  N. L. ETTEN  2,116,755
WRINGER MECHANISM
Filed Jan. 23, 1935  2 Sheets-Sheet 2
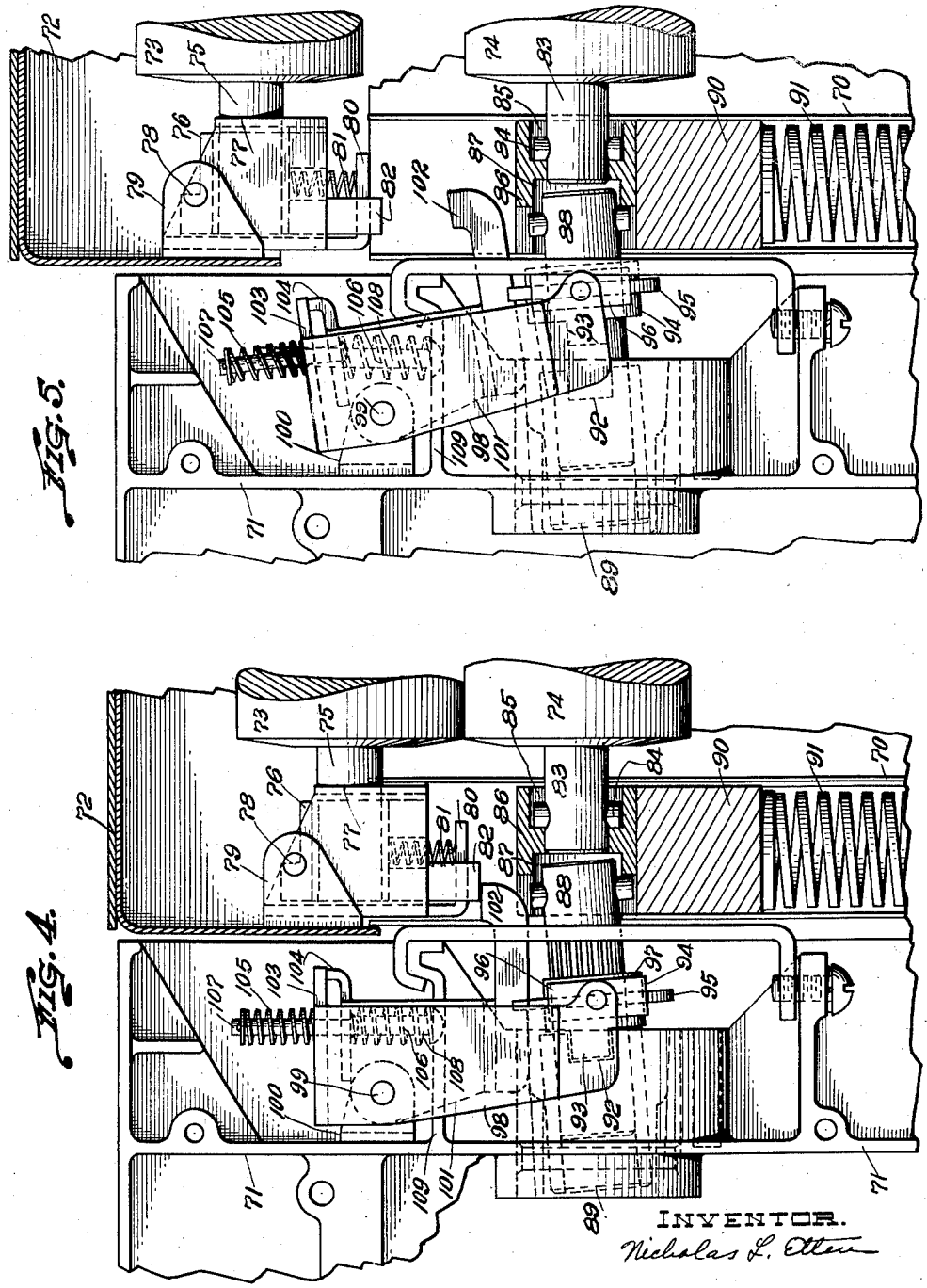
INVENTOR.
Nicholas L. Etten
BY
ATTYS.

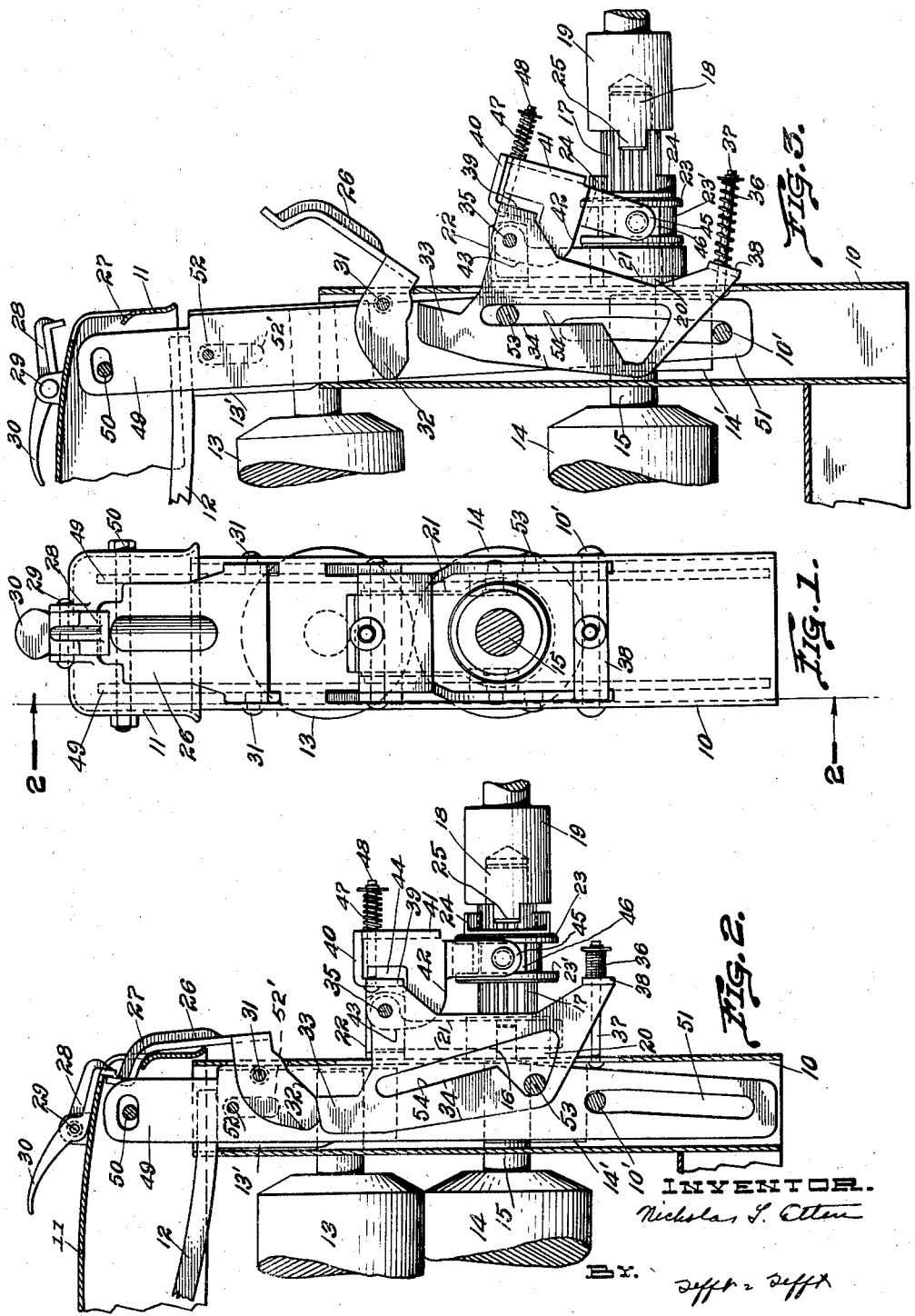
May 10, 1938.  N. L. ETTEN  2,116,755
WRINGER MECHANISM
Filed Jan. 23, 1935  2 Sheets-Sheet 1

Patented May 10, 1938

2,116,755

UNITED STATES PATENT OFFICE 2,116,755

WRINGER MECHANISM

Nicholas L. Etten, Waterloo, Iowa, assignor to Chamberlain Corporation, Waterloo, Iowa Application January 23, 1935, Serial No. 3,119

2 Claims. (Cl. 68—32)

This invention has reference to roll stop mechanism for roll wringers and has for one of its objects the provision of means whereby releasement of the working pressure between wringer rolls brings about discontinuance of rotation of the rolls.

Another object is to provide mechanism cooperating between a member of the roll tensioning mechanism and the wringer driving mechanism in such a manner that releasement of the tensioning mechanism results in disconnection of the roll driving means.

A further object is to provide a conventional roll wringer which may be used with increased safety by reason of automatic stoppage of the wringer rolls simultaneously with release of the tensioning means.

Other objects will appear in the following description and accompanying drawings in which—

Fig. 1 is an end elevational view of a wringer mechanism showing a preferred embodiment of my invention;

Fig. 2 is a fragmental side elevational view taken from line 2—2 in Fig. 1;

Fig. 3 is a side elevational view partly in section showing certain parts of the mechanism in released position, as will be referred to in the appended description;

Figs. 4 and 5 are fragmental side elevational views showing a modified form of my invention as the same may be applied to roll wringer mechanisms of a form other than that shown in Figs. 1 to 3 as will be described.

Referring to the drawings, Fig. 2 discloses the end portion of a conventional roll wringer mechanism which includes a frame structure 10 having a releasable top member 11, a tensioning spring 12 and upper and lower rolls 13 and 14.

The upper roll 13 is journaled as by the inverted bearing block 13' which is slidably supported in frame 10 and urged downwardly by spring 12. Lower roll 14 is journaled as by a bearing block 14' rockably supported in frame 10 upon a pin 10'. It will be clear that with the frame 11 disposed as in Fig. 2, spring 12 is available to force roll 13 downwardly and maintain pressure relation with roll 14.

The lower roll 14 has its shaft 15 somewhat elongated and flattened as at 16 which flattened portion is adapted to be received in a mating opening formed in a splined member 17.

The opposite end of member 17 is reduced to become a stud end 18 which is rotatably fitted within an opening in a clutch coupling member 19 which latter has driving relationship with a power source not shown.

At its inner end, the splined member 17 is provided with a collar portion 20 which is journaled in a strap member 21 which is secured to an outwardly extending bracket portion 22 of the frame 10. By means of this support spline 17 is rotatably retained in proper alignment with wringer roll shaft 15.

Slidably mounted upon, and in keyed relationship with, spline 17 is a clutch member 23 which has a continuous groove 23' about its periphery and teeth 24 extending from its right hand end. Obviously, teeth 24 are adapted to engage with mating teeth 25 formed in the member 19.

It will be apparent that sliding movement of clutch member 23 upon spline 17 will result in engagement or disengagement of the clutch teeth 24 and 25 to rotate roll 14 in unison with member 19 or to break the driving connection.

Fig. 2 will illustrate that the top frame 11, in which spring 12 is assumed to be supported, is releasably secured to the upper end of frame 10 by means of a latch member 26 engaged with a lip portion 27 of the top frame and retained by a hook member 28 which is pivotally mounted thereon, at 29.

Hook 28 is provided with a handle portion 30 by means of which the hook may be moved to non-engaging position with latch 26 whereupon the latch may no longer support frame 11 against the upward pressure of spring 12. The resulting movement of the mechanism is shown in Fig. 3, wherein the top frame and upper roll are shown in elevated position resulting from relaxing movement of spring 12.

Referring again to Figs. 1 and 2, it will be noted that latch 26 is yoked and pivoted at 31 upon rivets secured in either side wall of frame 10. The side portions of the latch are provided with extending end portions 32 which are adapted to engage the upper ends of side portions 33 of a yoke member 34. Member 34 is pivotally mounted at 35 upon the bracket 22 and is normally urged to rotate thereon in a clockwise direction, Fig. 2, by a spring 36 confined upon a pin 37 secured in the end wall of frame 10 in engagement with a lower connecting portion 38.

An upper connecting portion 39 of this lever carries an outwardly extending lip portion 40 which normally engages with the upper edge of a connecting portion 41 of a yoke member 42.

Member 42 is so fashioned as to have lateral and upwardly extending side portions 43 by means of which it is pivoted at 35 similar to member 34.

Fig. 2 illustrates that the fashioning of member 42 provides a recess 44 whereby members 34 and 42 may rock upon the pivot 35 independently of each other.

Member 42 carries downwardly extending portions 45 which in turn carry swively mounted blocks 46, the latter being slidably fitted in groove 23' of clutch member 23.

Reference to Fig. 3 will indicate that clockwise pivotal movement of member 34 will bring about pressure of portion 40 thereof against portion 41 of member 42 to rock the same upon pivot 35 to bring about the described clutching movement of clutch member 23.

A coil spring 47 confined upon a pin 48 secured in connecting portion 39 of member 34 normally retains portions 41 and 40 in working contact.

To bring about the described pivotal movement of member 34, means as follows is provided:

Roll wringer structure such as has been described conventionally includes devices for guiding the releasable top member, when the same has been released, whereby the released and substantially separated top member is more easily reassembled on the lower frame and further, such devices are utilized to limit the separating movement of the top frame relative to the lower frame.

Such devices are herein shown as comprising dual link members 49 disposed inside and adjacent either side of frame 10, depending from a pin 50 secured in the top frame and extending downwardly to a point adjacent the lower end of the lower frame.

At their lower ends the links are provided with angulated slots 51 which slidably fit over the pin 10' in such a manner that the links are free to slide vertically in the frame 10 within the limits of the slots and whereby the top frame is free to move within this limit relative to the lower frame. A pin 52 secured in the links and passing through a slot 52' in bearing block 13' holds the links and block in assembled relationship. Slot 52' obviously permits block 13' to rise and fall responsively to movements of roll 13.

To each of the links, at a point somewhat above the upper ends of slots 51 are secured rivets 53 which are adapted to be received in slotted openings 54 formed in the side members of yoke 34. The slots 54 are so fashioned that when the mechanism is assembled as shown in Fig. 2, the rivets 53 occupy lower enlarged portions of the slots, the edges of which form a cam face engageable with the rivets to produce pivotal movement of member 34 when the rivets move upwardly as carried by links 49 during upward movement thereof in unison with release movement of the top frame as described.

Fig. 3 illustrates the relative movement of the parts when release takes place wherein pin 53 during upward movement has cammed in slot 54 to force member 34 into the position shown to bring about lateral movement of clutch 23 out of engagement with clutch coupling 19.

It will be noted that when the mechanism is assembled as in Fig. 2, the portion 32 of latch 26 engages portion 33 of member 34 whereby member 34 is prevented from operating to disengage the clutch. Since spring 47 normally retains member 42 in definite position relative to member 34, the portion 32 when in locked position is capable of retaining clutch elements 24 and 25 against unintended disengagement.

At the time of release, movement of latch 26 first takes place and portion 32 thereof is thus removed to allow functioning of the de-clutching mechanism as described.

Re-assembly of the parts after release is accomplished by replacing the top frame upon the lower frame 10, and rotating latch 26 into position shown in Fig. 2, whereby the rivets 53 are disposed in the enlarged portion of slot 54 and the portion 32 of the latch cams upon the portion 33 of member 34 to rotate and retain it in the relative position shown in Fig. 2. The described movement of member 34 moves clutch 23 into engaged position as shown.

Obviously, there are many possible adaptations of this invention such as may be necessary to apply it to wringer mechanisms having forms other than that of the wringer above considered.

To illustrate practical application of the device to wringers of various typical forms, Figs. 4 and 5 show its application to a wringer mechanism having its tensioning means disposed in the lower part of its frame to operate upon the lower power driven roll.

Fig. 4 fragmentarily illustrates a wringer mechanism comprising a main frame 70, a side mechanism supporting structure 71, a releasable top frame 72 and upper and lower rolls 73 and 74.

Shaft 75 of the upper roll 73 is journaled in a bearing member 76 which is supported in a cradle member 77, the latter being pivotally supported upon a pin 78 which is supported in a bracket member 79 secured to the top frame 72.

Cradle member 77 has a downwardly and laterally extending portion 80 upon which is supported a spring 81, the opposite end of which abuts bearing 76 to take up lost motion, due to wear, in the bearing mechanism. The cradle also carries a downwardly extending portion 82 which will be referred to shortly.

The shaft 83 of lower roll 74 is provided with a pin 84 which acts as a key disposed in slots 85 formed in a coupling member 86.

The opposite end of member 86 is provided with a cavity 87 having slots formed in its side wall adapted to receive, in a loose manner, the keyed end of a splined coupling member 88.

The opposite end of member 88 is rotatably mounted in a coupling member 89 and the opposite end of the latter is adapted to receive the end of a driving shaft in driving relationship. The driving shaft is not shown.

The coupling member 86 is journaled upon a bearing block 90 which is slidably mounted in the frame structure 70 and is supported upon and urged upwardly by a compression spring 91 which is supported upon a bottom member of frame 70, not shown.

The foregoing will indicate that the upper roll 73 is stationarily supported in the top frame 72 and that lower roll 74 is resiliently supported to press against the upper roll by the spring 91. It is assumed that the rolls are supported in a similar manner at their opposite ends.

It has already been noted that splined member 88 is rotatably supported in the coupler 89 and it is assumed that the coupler is secured to a power driven shaft by means of which it is constantly rotated.

The inner end of the coupler is provided with indentures 92 adapted to receive tooth portions 93 of a clutch member 94 which is slidably mounted, in keyed relation, on the splined portion of coupling member 88. It will be apparent that clutch member 88 may be slid to the left upon the spline to engage teeth 93 in dentures 92 to establish driving connection between coupler 88 and lower roll 74, or in the opposite direction to disengage the clutching parts.

Clutch member 94 is provided with a continuous flange 95 about its periphery, which flange is slidably received in grooved blocks 96 disposed on opposite sides of the clutch member. The latter are swively mounted in depending portions 97 of a yoke member 98 which is pivotally mounted at 99 upon a pin supported by brackets 100 secured to the frame structure 71.

Also pivoted at 99 is a yoke member 101 having at its lower end an inwardly extending portion 102 adapted to be engaged by the portion 82 of member 77.

The upper connecting portion of member 98 has a laterally extending portion 103 which is normally held in contact with an adjacent angulated portion 104 of member 101 by means of springs 105 and 106.

Spring 105 is confined upon a pin 107 which loosely passes through connecting portion 103 of member 98 and is secured in the connecting portion 104 of member 101.

Spring 106 is confined upon a pin 108 which has its head imbedded in a rib portion 109 of structure 71.

With the foregoing in mind, it will be clear that spring 105 abuts portion 103 while the head of pin 107 by which it is confined presses against the under side of portion 104, thus urging portions 103 and 104 into abutment at their outer ends and holding members 98 and 101 in position relative to each other.

Spring 106 reacts between the stationary rib 109 and the under side of portion 104 and thus urges members 98 and 101 to rotate upon pivot 99 in a counter-clockwise direction, which movement bring about sliding movement of clutch member 94 toward the right to disengage the clutching parts as already described.

With parts assembled as in Fig. 4, the described movement is prevented by abutment of portion 102 of member 101 with portion 82 of member 77.

In Fig. 5 are shown the parts just described, in released position, wherein the top frame 72 has been released from the lower frame 70 and the contact pressure between the wringer rolls has been relieved. As a result of the upward movement of the upper frame, portion 82 has been removed from abutment with portion 102, thus allowing spring 106 to move the mechanism to disengage the driving connection of the lower roll 74.

In the above described manner, release movement of the upper frame and roll automatically brings about disconnection of the lower roll driving means.

Release mechanism for the top frame is not herein shown or described as such mechanisms are thought to be sufficiently conventional to obviate description.

What I claim is:

1. In a clothes wringer, a lower frame, a top frame movable with respect to the lower frame, cooperating rolls mounted in the frames, pressure mechanism for the rolls reacting between the frames and tending to separate the same, releasable means for holding the frames together, driving mechanism for the rolls including a clutch element shiftable between a driving position and an idle position, and means for shifting said element to said idle position upon separation of the top frame from the lower frame, said means comprising a pair of interconnected levers having a common fulcrum fixed with respect to the lower frame, one of said levers having an end engaging said clutch element, and the other lever having an end engaging a part movable in response to the separation of said top frame from the lower frame, and means for imparting rocking movement in one direction to the last mentioned lever upon movement of said part, the interconnection of said levers comprising abutting surfaces arranged to transmit positively said rocking movement of the last mentioned lever to the first mentioned one to cause the end thereof engaging said clutch element to shift the latter to idle position.

2. In a clothes wringer, a lower frame, a top frame movable with respect to the lower frame, cooperating rolls mounted in the frames, pressure mechanism for the rolls reacting between the frames and tending to separate the same, safety release mechanism for holding the frames together against the reaction of said pressure mechanism, driving mechanism for the rolls including a clutch element shiftable between a driving position and an idle position, and means for shifting said element to said idle position upon actuation of said safety release mechanism to separate the top frame from the lower frame, said safety release mechanism comprising a latch member pivoted on said lower frame and having an upper portion releasably engaging the top frame and a lower portion movable in response to releasing movement of the upper portion, said clutch shifting means comprising lever mechanism pivoted to the lower frame and having a part engaging said clutch element and another part engaging the lower portion of said latch member, and means for imparting rocking movement to the lever mechanism in a direction to shift said clutch to idle position upon movement of the latch member to release position.

NICHOLAS L. ETTEN.